Jan. 15, 1957  G. A. SIMONE  2,777,187

ARM-POSITIONING DEVICE FOR USE BY EMBALMERS

Filed March 30, 1953

INVENTOR
GUY A. SIMONE
BY
*Mason & Graham*
ATTORNEYS

United States Patent Office 2,777,187
Patented Jan. 15, 1957

2,777,187

ARM-POSITIONING DEVICE FOR USE BY EMBALMERS

Guy A. Simone, Los Angeles, Calif.

Application March 30, 1953, Serial No. 345,348

1 Claim. (Cl. 27—21)

My invention has to do with arm-positioning devices for use by embalmers. In preparing a corpse for burial, it is desirable that the arms and hands be properly positioned, that is, the arms should assume a natural position beside the body with the hands folded over the chest. This is difficult, particularly after rigor mortis has set in, because in that event the hands and arms tend to resume the position which they occupied prior to rigor mortis.

It is an object of the present invention to provide an arm-positioning device which is highly sanitary, simple in construction, and which is capable of positively retaining the arms in proper position, even though the effects of rigor mortis tend to cause them to assume an objectionable position.

It is another object to provide an arm-positioning device which is fully adjustable in all material respects. Other objects will appear hereinafter.

Without intending thereby to limit the broader scope of my invention, except as may appear from the appended claim, I shall now describe a presently preferred embodiment thereof, for which purpose I shall refer to the accompanying drawings, wherein:

Figure 1:
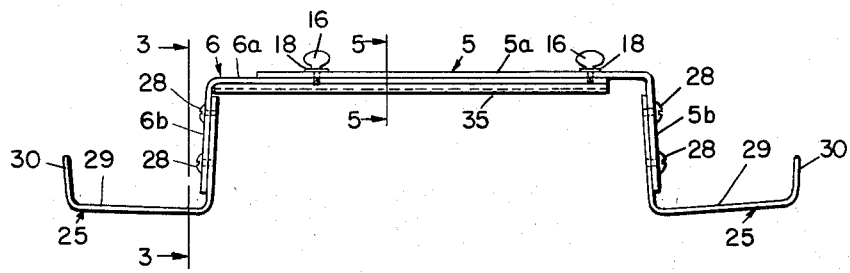
Fig. 1 is a front elevation.
Figure 2:
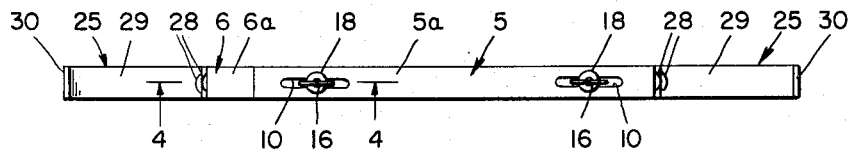
Fig. 2 is a top plan view.
Figures 3, 4:
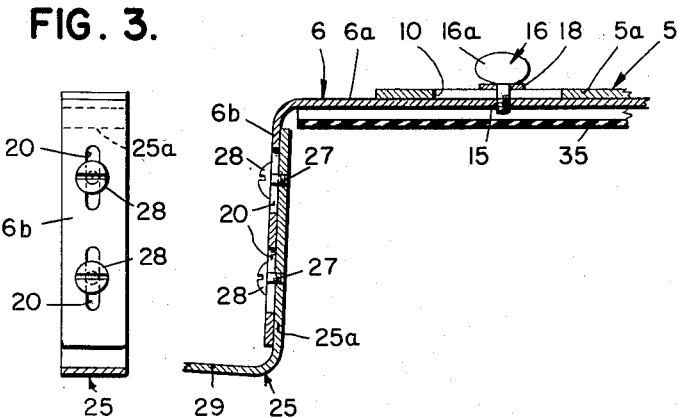
Fig. 3 is an enlarged end view taken on line 3—3 of Fig. 1.
Fig. 4 is an enlarged section taken on line 4—4 of Fig. 2.

Referring now to the drawings, the embodiment of my invention therein illustrated includes a somewhat yoke-shaped device comprising a pair of flat bars 5, 6, each of which has a relatively long top arm 5a, 6a and a depending vertically disposed relatively short arm 5b, 6b.

The uppermost arm, which is shown as arm 5a, has a pair of longitudinally spaced, longitudinally disposed slots 10, while the lower arm, 6a, has a pair of longitudinally spaced threaded screw holes 15 registering with the respective slots. A screw 16, having a head 16a, is passed through each slot and threaded into one of the holes 15, there being interposed between the head of each screw and the underlying portion of arm 5a a washer 18 to prevent the head of the screw from passing through the slot. Thus, the distance between the depending arms 5b, 6b may be adjusted by relatively adjusting arms 5a, 6a and locking them in adjusted position by means of the screws. Such adjustability is desirable because there is a variance in the sizes of different corpses.

Each of the depending arms 5b, 6b has a pair of longitudinally spaced, longitudinally disposed slots 20 for the purpose to be described.

Adjustably secured to each of the depending arms 5b, 6b there is an L-shaped arm rest member 25. Each of the members 25 has a vertical arm 25a through which two longitudinally spaced screw holes 27 are formed to threadedly receive screws 28. Each of the members 25 also has a horizontal arm portion 29 terminating in an upwardly, substantially right-angularly disposed portion 30. The purpose of the right-angularly upwardly disposed portion 30 of each arm rest member is to prevent the arms of the corpses from slipping off the end of the support, and the purpose of the adjustability provided by the screws 28 and slots 20 is to adjust the device to vary the distance of the arm rest from the arms 5a, 6a to suit the device for corpses of different sizes.

In use, the device is placed over the chest of the corpse with the arms 5a, 6a resting atop the chest, while the arm rests are disposed horizontally alongside the body of the corpse to support the arms.

Figure 5:
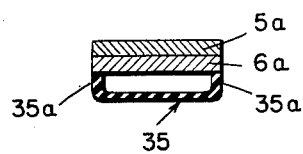
Fig. 5 is an enlarged section taken on line 5—5 of Fig. 1.

It is my preference to mount against the bottom surface of the bottom arm 6a a channeled rubber-like strip 35, the side flanges 35a of which may be secured to the arm 6a as by a suitable adhesive, if desired (see Fig. 5). This rubber-like sheathing prevents exposure of the bottom ends of the screws 16.

I claim:

In a device for positioning the arms of a corpse, a pair of superimposed arms disposed to extend across and rest upon the chest of said corpse, one of said arms having a longitudinally disposed slot therethrough and the other of said arms having a headed screw threaded therein and extending through said slot whereby to provide relative longitudinal adjustment of said arms and retention of said arms in a position of adjustment, a depending outer end extension for each of said arms and a pair of U-shaped arm rests each having a substantially horizontal portion and a pair of substantially parallel, upright side portions, the side portion of each of said arm rests being vertically slidably adjustably secured to one of said respective extensions.

References Cited in the file of this patent

UNITED STATES PATENTS

| 402,095 | Moharter | Apr. 23, 1889 |
| 1,671,862 | Heinz | May 29, 1928 |
| 2,047,441 | Starbuck | July 14, 1936 |
| 2,496,605 | Simmons | Feb. 7, 1950 |